US008461706B2

(12) United States Patent
Miller et al.

(10) Patent No.: US 8,461,706 B2
(45) Date of Patent: Jun. 11, 2013

(54) FLOW DEVELOPMENT AND COGENERATION CHAMBER

(75) Inventors: Alan Miller, Littleton, CO (US); Darin L. Lane, Hollister, CA (US)

(73) Assignee: Spiroflo Holdings, Inc., Littleton, CO (US)

( * ) Notice: Subject to any disclaimer, the term of this patent is extended or adjusted under 35 U.S.C. 154(b) by 29 days.

(21) Appl. No.: 13/231,851

(22) Filed: Sep. 13, 2011

(65) Prior Publication Data

US 2012/0001430 A1 Jan. 5, 2012

Related U.S. Application Data

(63) Continuation-in-part of application No. 12/647,275, filed on Dec. 24, 2009, now Pat. No. 8,026,621, which is a continuation of application No. 11/290,152, filed on Nov. 29, 2005, now Pat. No. 7,663,261.

(60) Provisional application No. 60/653,548, filed on Feb. 15, 2005.

(51) Int. Cl.
*F03B 13/00* (2006.01)
*H02P 9/04* (2006.01)

(52) U.S. Cl.
USPC ............................................. 290/43; 290/54

(58) Field of Classification Search
USPC ......... 290/44, 43, 54, 55; 60/398; 416/132 B; 415/4.5, 905, 3.1, 210.1; 137/810, 811; 366/336, 338, 165.1, 165.2, 174.1, 175.2; 406/61, 191, 192, 195
See application file for complete search history.

(56) References Cited

U.S. PATENT DOCUMENTS

| 622,474 | A | | 4/1899 | Hoskin |
| 2,361,150 | A | | 10/1944 | Petroe |
| 2,949,540 | A | | 8/1960 | Clayton |
| 4,108,721 | A | | 8/1978 | Drzewiecki et al. |
| 4,155,022 | A | | 5/1979 | Crockett |
| 4,159,426 | A | * | 6/1979 | Staton ............................ 290/44 |
| 4,176,283 | A | | 11/1979 | McLaren |
| 4,224,527 | A | | 9/1980 | Thompson |
| 4,274,009 | A | * | 6/1981 | Parker, Sr. ...................... 290/43 |

(Continued)

FOREIGN PATENT DOCUMENTS

| GB | 2 257 476 A | 1/1993 |
| JP | 56077565 A | 6/1981 |
| JP | 60240878 A | 11/1985 |

OTHER PUBLICATIONS

International Search Report for International Application No. PCT/US06/04510, dated Oct. 26, 2007, 3 sheets.

*Primary Examiner* — Julio Cesar Gonzalez
(74) *Attorney, Agent, or Firm* — Christie, Parker & Hale, LLP

(57) ABSTRACT

A fluid handling and cogeneration system has an inlet conduit receiving a fluid, a housing having a inlet end, a outlet end and an interior surface. The housing encloses an inner body which together with the housing is arranged to form an annular space between the interior surface of the housing and an exterior surface of the inner body. The system also includes at least one diverter configured such that the fluid is directed to circulate around the inner body and traverse the annular space from the diverter toward the outlet end of the housing in an organized fashion. A generator is provided within the housing to harness the fluid traversing the annular space to generate electrical power.

22 Claims, 12 Drawing Sheets

U.S. PATENT DOCUMENTS

| | | | |
|---|---|---|---|
| 4,308,464 A | 12/1981 | Yamamoto | |
| 4,392,063 A | 7/1983 | Lindquist | |
| 4,500,228 A | 2/1985 | McDonald et al. | |
| 4,555,637 A | 11/1985 | Irvine | |
| 4,740,711 A * | 4/1988 | Sato et al. | 290/52 |
| 4,753,535 A | 6/1988 | King | |
| 4,834,343 A | 5/1989 | Boyes | |
| 5,167,483 A | 12/1992 | Gardiner | |
| 5,298,818 A | 3/1994 | Tada | |
| 5,344,619 A | 9/1994 | Larwick et al. | |
| 5,977,649 A | 11/1999 | Dahill | |
| 6,011,334 A | 1/2000 | Roland | |
| 6,155,751 A | 12/2000 | Lane et al. | |
| 6,249,059 B1 | 6/2001 | Hosoda | |
| 6,412,709 B1 | 7/2002 | Sugiura | |
| 6,441,508 B1 | 8/2002 | Hylton | |
| 6,509,049 B1 | 1/2003 | Parsons et al. | |
| 6,595,179 B1 | 7/2003 | Kanno | |
| 6,659,118 B2 | 12/2003 | Lane et al. | |
| 6,661,112 B2 * | 12/2003 | Zeier et al. | 290/43 |
| 6,749,374 B1 | 6/2004 | Lane et al. | |
| 6,811,302 B2 | 11/2004 | Fleischli et al. | |
| 7,066,207 B2 | 6/2006 | Lane et al. | |
| 7,082,955 B2 | 8/2006 | Lane et al. | |
| 7,160,024 B2 | 1/2007 | Dougherty, Sr. et al. | |
| 7,357,565 B2 | 4/2008 | Gopalan et al. | |
| 7,661,872 B2 | 2/2010 | Daniels et al. | |
| 7,663,261 B2 | 2/2010 | Miller et al. | |
| 2001/0003291 A1 | 6/2001 | Uematsu et al. | |
| 2003/0072214 A1 | 4/2003 | Fleischli et al. | |
| 2003/0102038 A1 | 6/2003 | Lane et al. | |
| 2003/0201646 A1 | 10/2003 | Kaploun | |
| 2004/0074534 A1 | 4/2004 | Lane et al. | |
| 2004/0146394 A1 | 7/2004 | Turchetta | |
| 2004/0238654 A1 | 12/2004 | Hagen et al. | |
| 2005/0000581 A1 | 1/2005 | Lane et al. | |
| 2007/0028976 A1 | 2/2007 | Lane et al. | |
| 2007/0138797 A1 | 6/2007 | Reidy et al. | |
| 2010/0096857 A1 | 4/2010 | Miller et al. | |

* cited by examiner

FLOW DEVELOPMENT AND COGENERATION CHAMBER

CROSS-REFERENCE TO RELATED APPLICATION(S)

This application is a continuation of application Ser. No. 12/647,275, filed Dec. 24, 2009, to issue as U.S. Pat. No. 8,026,621 on Sep. 27, 2011, which application is a continuation of application Ser. No. 11/290,152 filed Nov. 29, 2005, now U.S. Pat. No. 7,663,261, issued on Feb. 16, 2010, which claims the benefit of U.S. Provisional Patent Application No. 60/653,548, filed Feb. 15, 2005, the entire disclosures of which are incorporated fully herein by reference.

BACKGROUND

This application is a new application in the area of electricity generation, e.g. by using the technology described in U.S. Patent Application Publication No. 2005/0000581, filed on Jun. 4, 2003, the entire disclosure of which is also incorporated herein by reference.

In the area of electricity generation, a need exists for a system which uses the motion generated in a strong organized flow of a fluid material traveling in a helical pattern surrounding a spiraling flow of the same or different material to allow for low energy input conveying of the materials, while at the same time using that spiraling flow for cogeneration capabilities to provide electricity for storage or to operate the system receiving said materials.

SUMMARY OF THE INVENTION

In one exemplary embodiment of the present invention, a flow development chamber comprises an exterior housing, an interior body within the exterior housing, at least one diverter to aid in the development of a spiral flow within the flow development chamber, and a generator device such as an electrical motor or a micro-generator device capable of generating electrical power using the motion of the spiral flow developed in the flow development chamber.

In an alternative embodiment, a fluid handling and cogeneration system comprises an inlet conduit receiving a fluid, a housing having a inlet end, a outlet end and an interior surface extending concentrically and increasing then decreasing in diameter from the inlet end to the outlet end of the housing, an inner body within the housing having an inlet end, an outlet end, and an exterior surface extending concentrically from the inlet end to the outlet end, wherein the housing and inner body are arranged to form a substantially unobstructed annular space between the interior surface of the housing and the exterior surface of the inner body, at least one diverter extending between the interior surface of the housing and the exterior surface of the inner body and configured such that the fluid is directed to circulate around the inner body and traverse the annular space from the at least one diverter toward the outlet end of the housing, and a generator within the housing harnessing the motion of the fluid traversing the annular space to generate electrical power.

BRIEF DESCRIPTION OF THE DRAWINGS

The detailed description of embodiments of the invention will be made with reference to the accompanying drawings, wherein like reference numerals designate corresponding parts in the figures, in which.

Figure 1:
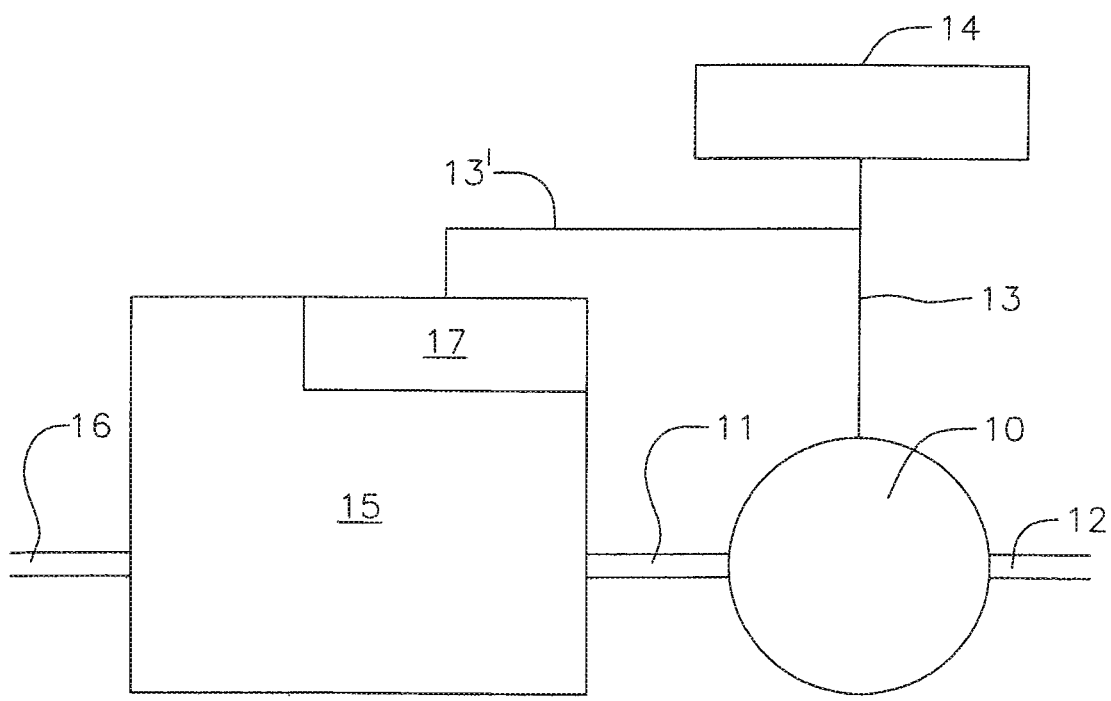
FIG. 1 is a schematic of a flow development and cogeneration system for use with various flow processing devices according to one embodiment of the present invention.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Furthermore, it is to be understood that the terminology used herein is for the purpose of illustrative description and should not be regarded as limiting.

DETAILED DESCRIPTION

As a fluid passes through an axial input flow development chamber of the type described in U.S. Patent Application Publication No. 2005/0000581, the beneficial nature of the spinning flow developed in the fluid may be harnessed to generate electricity using a micro generator, micro motor or other generation or cogeneration device.

FIG. 1 schematically shows a flow development and cogeneration system having a flow processing device 15, which may for example be a water heater, water pump, engine, or another device which receives and processes a fluid flow. The flow development and cogeneration system also includes a feed 16 for passing fluid to the flow processing device 15, after which it passes to an inlet conduit 11 of a flow development and cogeneration chamber 10. An outlet conduit 12 extends from the flow development and cogeneration chamber 10. A controller 17 may be provided coupled to the flow processing device 15 to regulate the amount of fluid input into the system. Electricity generated in the chamber 10 may be retained in a storage cell 14 by wiring 13 or used to cogenerate the device 15 by wiring 13', reducing the amount of power the device 15 must draw from an outside source. A more detailed description of FIG. 1 will be provided further on in this specification following a discussion regarding the nature and various embodiments of the flow development and cogeneration chamber 10.

Figure 2A:
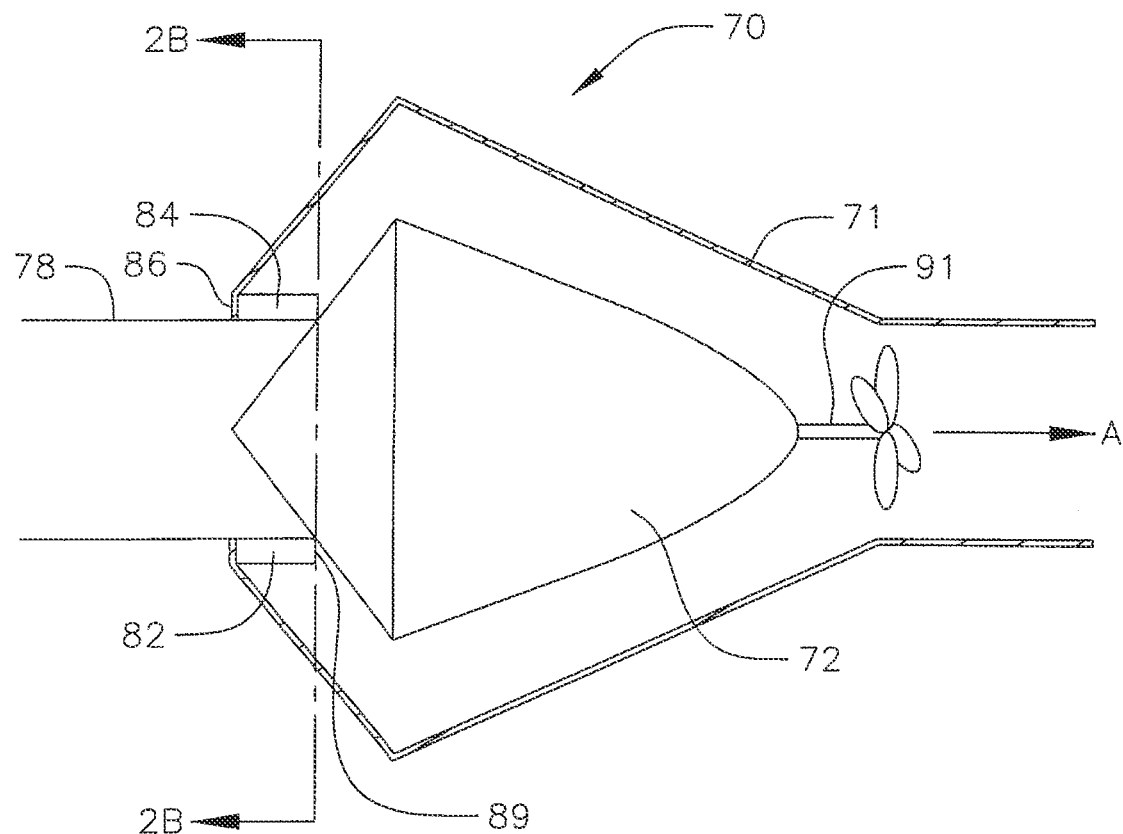
FIG. 2A shows a side view of a first embodiment of a flow development and cogeneration chamber wherein the fluid flows through the chamber in a forward direction.
Figure 2B:
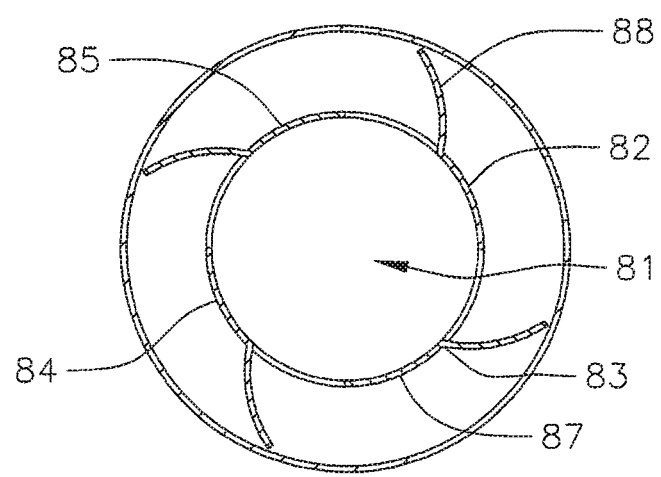
FIG. 2B shows a sectional view along line 2B-2B of the flow development and cogeneration chamber of FIG. 2A (the inner body omitted for illustration purposes)

Referring now to FIGS. 2A and 2B, a first embodiment of a flow development and cogeneration chamber 70 which can be used as the chamber 10 of FIG. 1 is shown. The flow development and cogeneration chamber 70 includes a housing 71 enclosing an inner body 72. In the exemplary embodiment shown, both the housing 71 and the inner body 72 are both formed radially symmetrically along a central axis, and have a double conical shape overall with a widest central diameter or equator, and taper off along the central axis away from the equator. When a fluid is circulated around the inner body 72 within the housing 71 in the direction of the arrow A as shown, an organized flow may be developed. A shaft mounted propeller 91 may be attached to the inner body 72 as shown in FIG. 2A to harness this organized flow. By harnessing the organized flow using the propeller 91 or another method, electricity may be generated. The blades of the propeller may be located in the chamber 70 or in the downstream pipe.

The housing 71 may be connected to an inlet pipe 78 by a plate 86, or the inlet pipe 78 may be directly connected to the inlet end of the housing 71 through the use of an adhesive, a weld or other appropriate means known to one skilled in the art. Deflecting vanes 82, 83, 84, 85 (as shown in FIG. 2B), which may also be called diverters, are formed from a downstream end (in the direction of the arrow A) of the inlet pipe 78.

The deflecting vanes 82, 83, 84, 85 aid in the development of the organized flow of fluid around the inner body 72 within the housing 71, and may be formed by making four axial cuts into the downstream end of the inlet pipe 78 and a circumferential cut toward one side to form a flap. The flap is then deflected outwardly to form the projecting portion of the deflecting vanes 82, 83, 84, 85. Accordingly, the end of the inlet pipe 78 includes four circular tube portions that are the inner portions 87 of the deflecting vanes 82, 83, 84, 85 and four outwardly projecting portions that are the projecting portions 88 of the deflecting vanes. Accordingly, in this embodiment, a double arcuate shape of the deflecting vanes 82, 83, 84, 85 is formed in a radial direction perpendicular to the central axis. These deflecting vanes 82, 83, 84, 85 have an upstream side adjacent the plate 86 and a downstream side 89 axially, and an inner portion 87 and a projecting portion 88 radially. In the embodiment shown, the deflecting vanes 82, 83, 84, 85 project axially from the inlet pipe 78. In this embodiment, the deflecting vanes 82, 83, 84, 85 deflect the fluid flow around the inner body 72.

Referring now to FIG. 2B, a top view of a portion of the exterior housing of the flow development and cogeneration chamber 70 of FIG. 2A is shown taken along the section 2B-2B of FIG. 2A. Deflecting vanes 82, 83, 84, 85 are depicted in FIG. 2B which outline an inner concentric circle 81.

As shown in FIG. 2A, deflecting vanes 82, 83, 84, 85 radially contact the outer housing 71 with the upstream ends of their projecting portions 88 and support the inner body 72 with the downstream ends of their inner portions 87. In an alternative embodiment of the invention, the deflecting vanes 82, 83, 84, 85 project radially in a line.

In alternative embodiments, the deflecting vanes 82, 83, 84, 85 may be variously angled, curved or otherwise modified to aid in the development of the organized flow as the fluid passes around the inner body. Additional alternative embodiments exist wherein less than four as well as more than four deflecting vanes are provided, and wherein these deflecting vane or vanes are mounted in either clockwise or counter-clockwise patterns. The deflecting vanes may be set at angles of 90 degrees, or at angles greater to or less than 90 degrees to the curve of the outlet.

FIGS. 3A-3F show further alternative embodiments of a flow development and cogeneration chamber having deflecting vanes 171 provided on a plate 172 fixed to the inlet pipe 174. The deflecting vanes 171 may be provided as individual pieces mounted directly to the plate 172 using an adhesive, fasteners or another appropriate method. The plate 172 may then be mounted to the inlet pipe 174 using a similar method. The plate and vane assembly mounted on the inlet pipe 174 may then be passed through an opening in a lower housing part 176 so that the plate 172 rests on an inner top surface 175 of the housing part 176. These may be bolted, welded, screwed together or otherwise fixedly attached. The housing part 176 is provided with a flange 177 so that it may engage with an upper housing part 178 to provide an exterior enclosure for the flow development and cogeneration chamber. These may be bolted, welded, screwed together or otherwise fixedly attached. The deflecting vanes may be provided to support an inner body 173, and may be provided with an angled edge 179 (see FIG. 3C) to better engage the surface of the inner body 173 along the full length of the downstream surface of the vane.

Figure 3A:
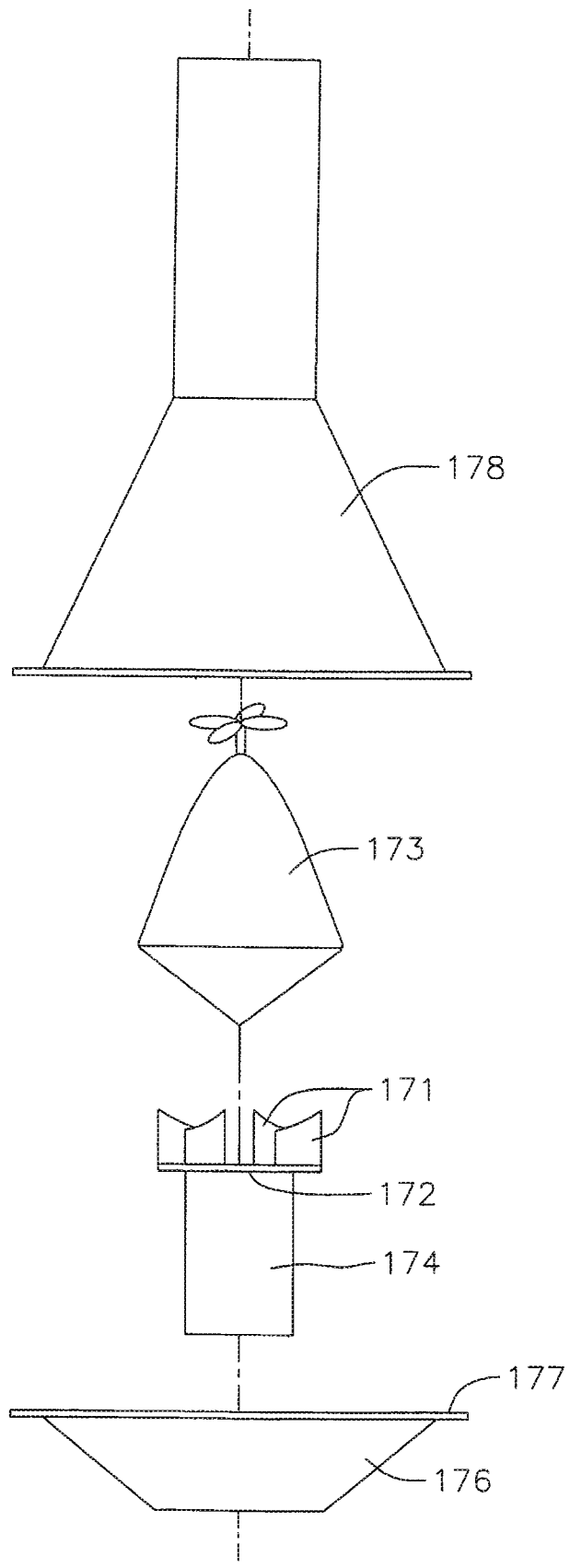
FIG. 3A is an exploded view of an alternative embodiment of a flow development and cogeneration chamber of the present invention.
Figure 3B:
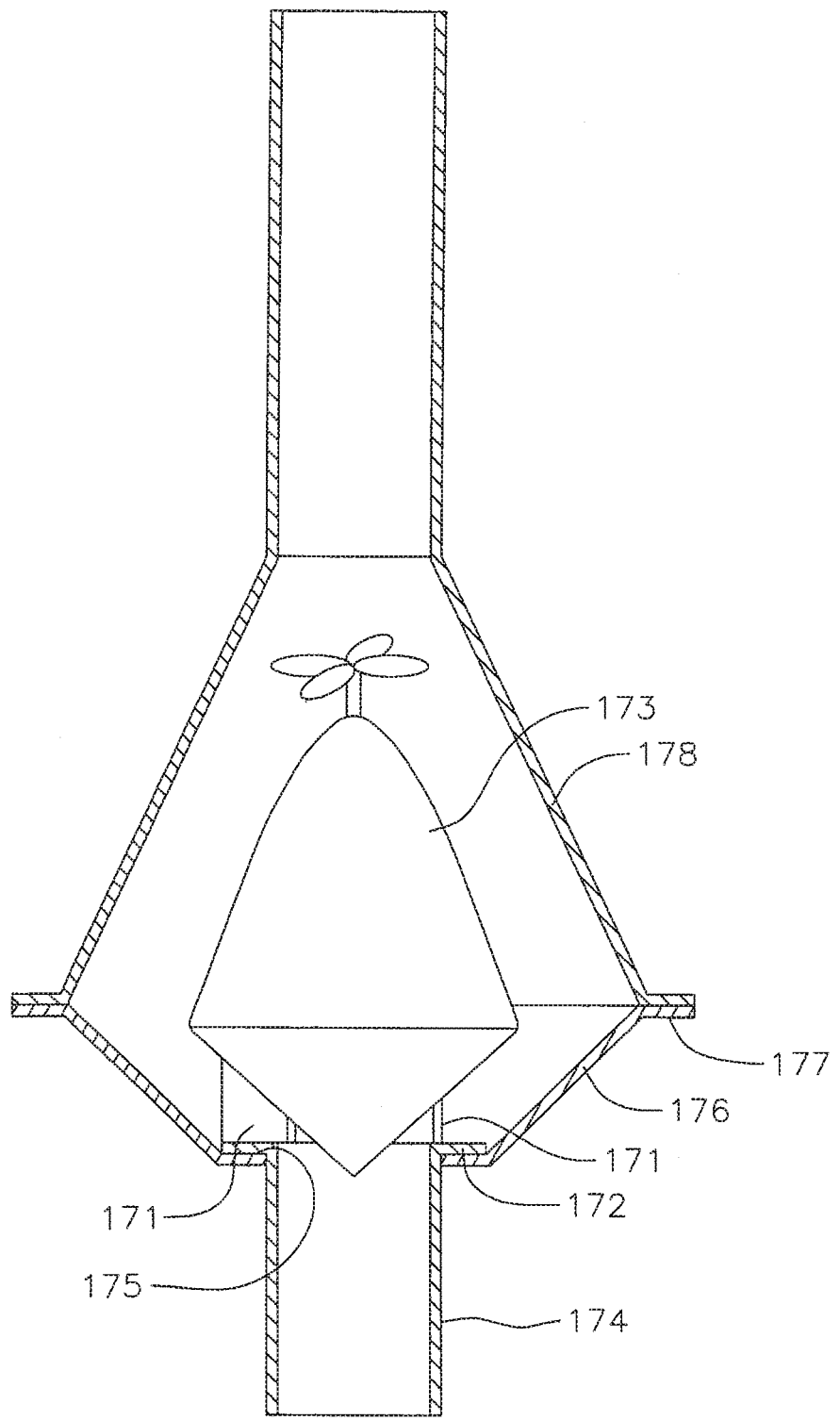
FIG. 3B is an assembled sectional view of the flow development and cogeneration chamber of FIG. 3A.
Figure 3C:
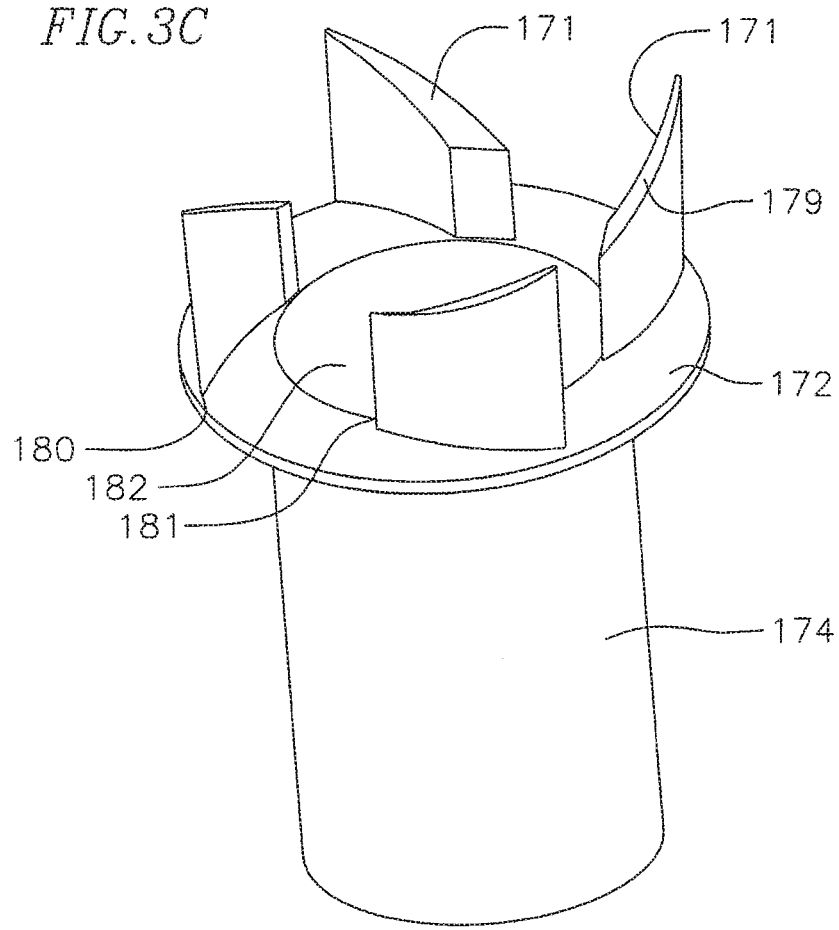
FIG. 3C is a perspective view of a deflector arrangement having angled ends for the flow development and cogeneration chamber of FIG. 3A.
Figure 3D:
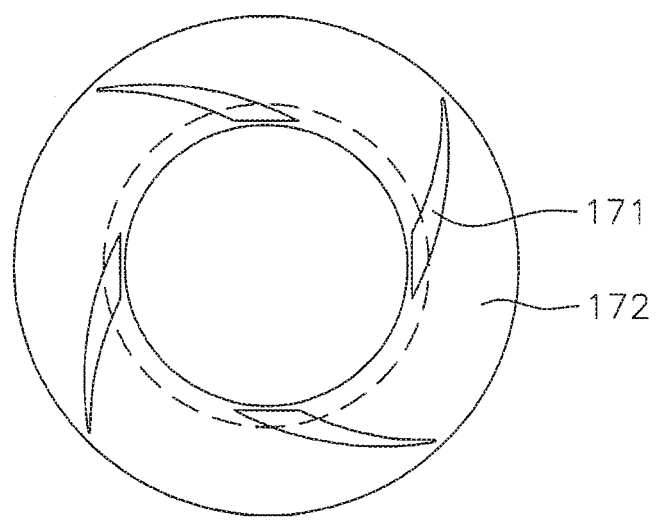
FIG. 3D is an end view of FIG. 3C.
Figure 3E:
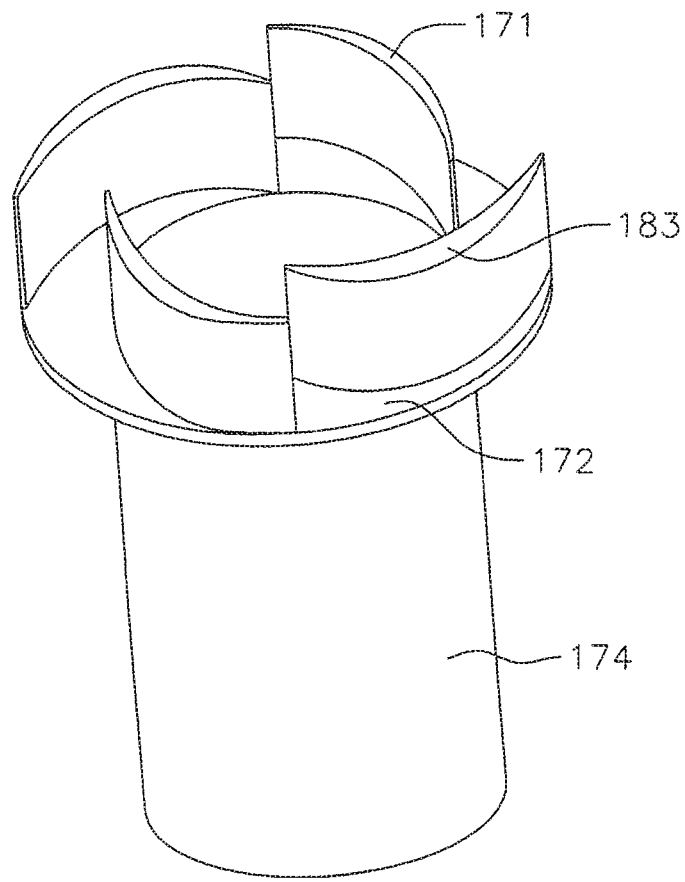
FIG. 3E is a perspective view of an alternative embodiment of a deflector arrangement having flat ends.
Figure 3F:
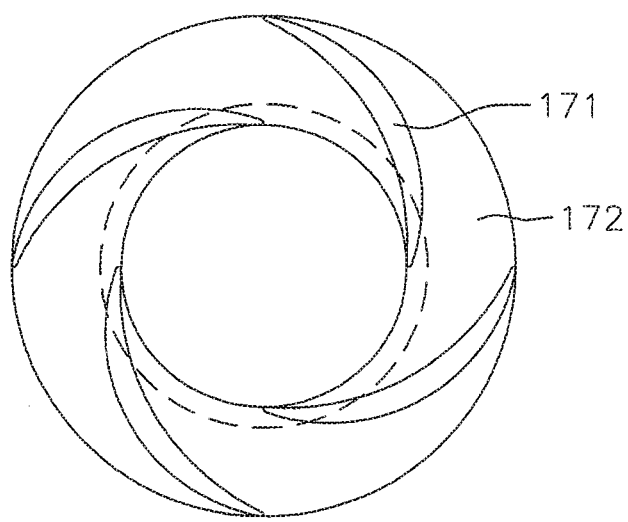
FIG. 3F is an end view of FIG. 3E.
Figure 3G:
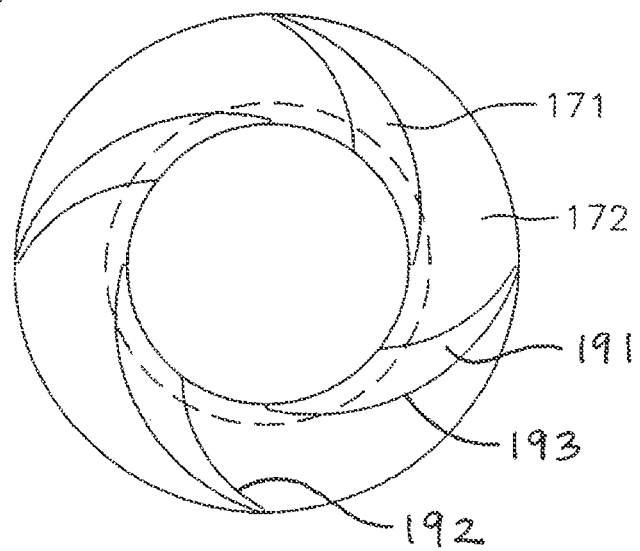
FIG. 3G is an end view, similar to FIG. 3F, of a second alternative embodiment of a deflector arrangement.

FIGS. 3C and 3D show the deflecting vanes 171 mounted on the plate 172 in a spiral pattern between the outer radius 180 and the inner radius 181 and a circular passage 182 through the plate 172. In an alternative embodiment, the deflecting vanes 171 have flat edges 183 (see FIGS. 3E and 3F), i.e., the full length of the downstream surface of the vane is a flat surface lying in a plane parallel to plate 172. In yet a further embodiment depicted in FIG. 3G, the deflecting vanes 191 have a double arcuate surface 192 on the inside and a single arc surface 193 on the outside. It will be appreciated that the deflecting vanes may be secured directly to the outer housing and/or inner housing and may comprise many configurations that cause incoming fluid to circulate around the inner body and traverse the annular space between the outer housing and inner body from the deflecting vanes to the outlet end of the chamber.

Figure 4A:
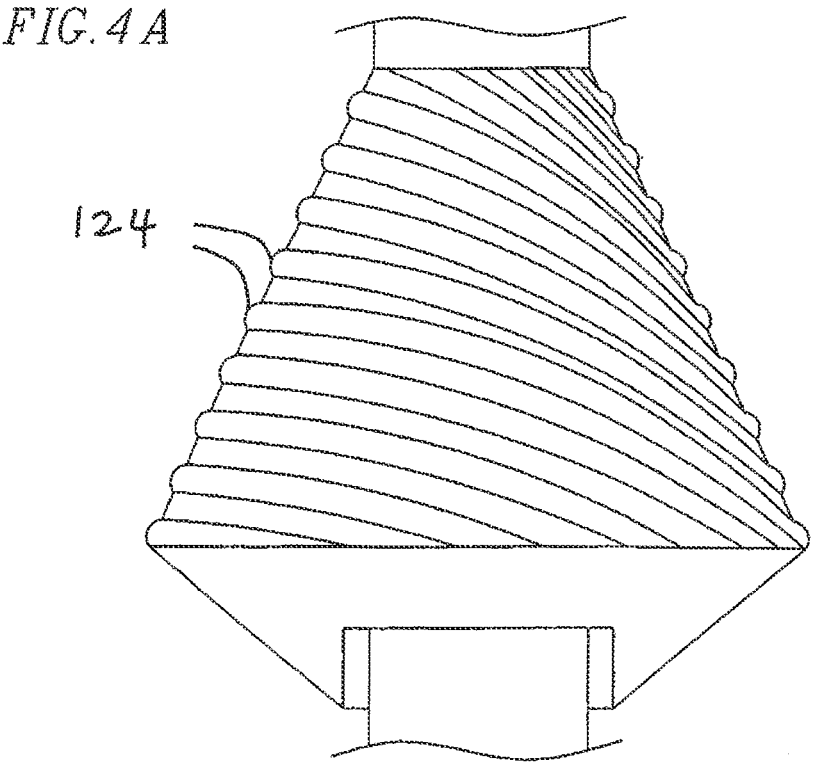
FIG. 4A is a schematic view of an interior rifled surface of an alternative embodiment of the outer housing.
Figure 4:
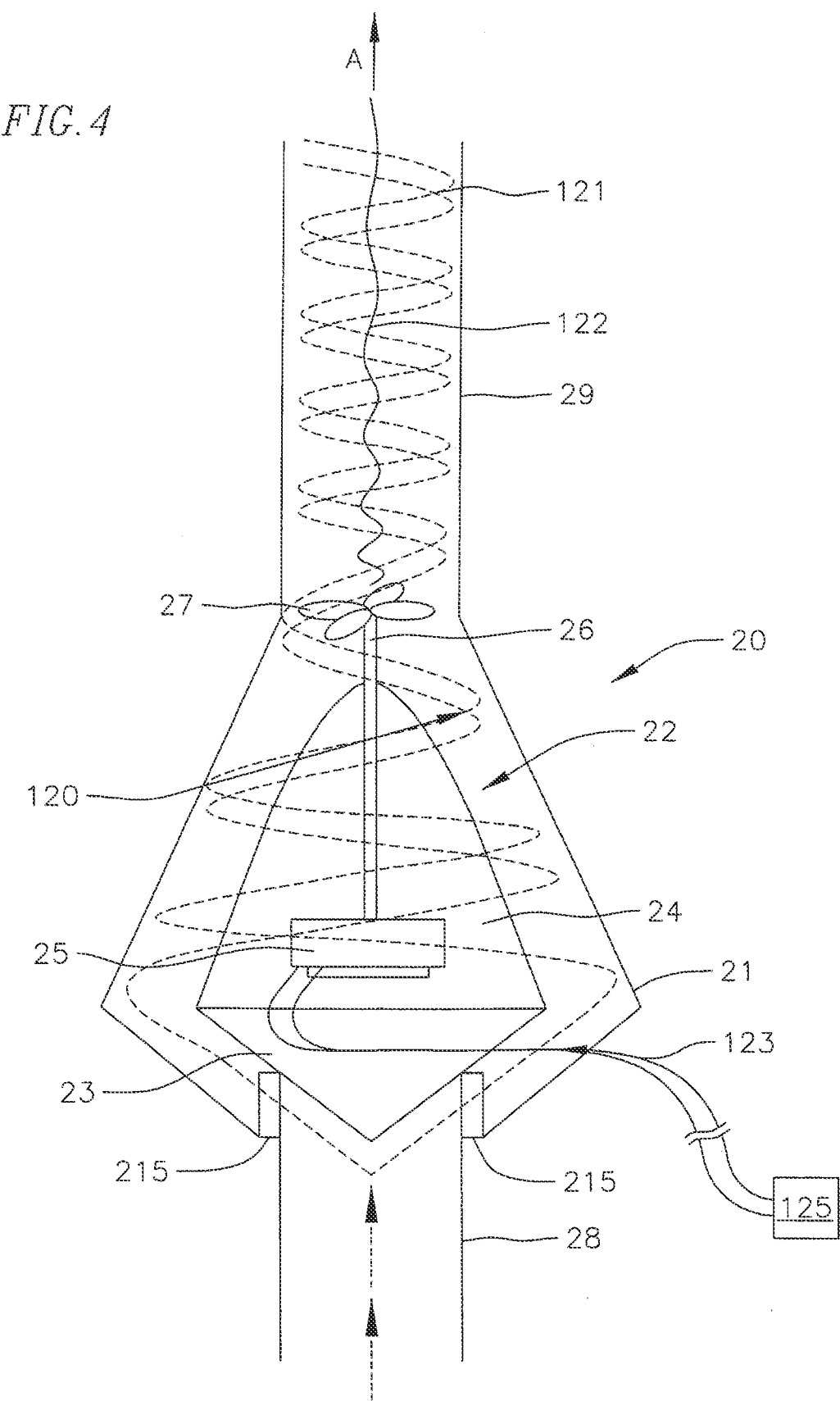
FIG. 4 shows a side view of another embodiment of a flow development and cogeneration chamber wherein the fluid flows through the chamber in a forward direction.

FIG. 4 through FIG. 8 show various other embodiments of flow development and cogeneration chambers in operation. It will be appreciated that the deflector arrangements of FIGS. 2A-3G, or other suitable arrangements may be used. FIG. 4 for example shows one such embodiment wherein a fluid passes through a flow development and cogeneration chamber 20 in the direction of arrow A. The chamber 20 comprises a housing 21 connected to an inlet pipe 28 and an outlet pipe 29, and enclosing an inner body 22. Deflecting vanes 215 are provided in the chamber adjacent the inlet pipe or formed from an upstream end of the inlet pipe 28. As above, the deflecting vanes 215 aid in the development of the organized flow as a fluid passes around the inner body 22 within the housing 21. The inner body 22 itself may comprise a first section 23 and a second section 24 joined to one another.

Although the embodiment of the inner body 22 shown is provided in two separate sections, the second rounded section 24 and the first pointed section 23, it will be understood by those skilled in the art that the inner body may comprise any combination of a first section which is either rounded or pointed, and a second section which is also either rounded or pointed. The sections of the inner body may be conical or substantially conical and include a portion extending into the housing of the flow development chamber or into the conduits adjacent to the flow development chamber for greater stability. In still other embodiments, various shapes can be utilized to make up the sections of the inner body, including non-concentric sections. In a more general embodiment, the inner body may comprise a single section, broadly conical in shape, pointed in the direction of the source of the fluid flow. In yet another embodiment, the inner body may be spherical, cylindrical, or any appropriate shape known to one skilled in the art.

The housing 21 shown in FIG. 4 is formed from a pair of conical portions to match the inner body 22 so that an annular space is provided between the interior surface of the housing 21 and the exterior surface of the inner body 22. However as with the inner body 22, many variations in shape are possible for the housing 21, e.g., the housing 21 may be spherical, cylindrical, or any appropriate shape known to one skilled in the art. The housing 21 may also be made from a variety of materials, although if the chamber 20 is to process hard particulate matter it is preferable that the material be a durable material capable of contacting a wide variety of substances without sustaining substantial damage. In various alternative embodiments, materials used for the housing may comprise aluminum, stainless steel, copper, brass, black metal, rubber, plastic, ceramic, fiber-glass, and composites or other durable materials. One or more of these materials may also be used to manufacture the other components of the flow development chamber as well.

After entering the inlet pipe 28 of the chamber 20, the fluid is deflected and travels through the annular space between the interior surface of the housing 21 and the exterior surface of the inner body 22. At this point, the fluid develops a steady organized spiral or vortex flow 120. This organized flow 120, which is a combination of a sink flow and an irrotational vortex flow, is a counterclockwise flow in the embodiment shown when viewed along an axis running between the inlet pipe 28 and the outlet pipe 29, although in an alternative embodiment a clockwise flow is also possible.

As the organized flow 120 moves through the chamber 20 it accelerates and Taylor vortices, in the form of a boundary layer flow, begin to form along the inner surface of the housing 21 such that the forming boundary layer flow surrounds the organized flow 120. The flow then travels out of the chamber 20 into the outlet pipe 29 coupled to the chamber 20.

The organized flow 120 continues to travel through the outlet pipe 29 as a spiraling vortex flow 122 surrounded by a helical flow 121. The length of the organized flow 120 can vary with the volume of fluid or product mass.

As shown in FIG. 4, the chamber 20 is provided with an inner body 22 having both a second section 24 and a first section 23. The first section 23 is fixably mounted within the housing 21 of the chamber 20, and a generator such as a micro generator 25 is fixably mounted to the first section 23. In one embodiment, the first section 23 of the inner body may be held in place using the diverters 215 in a manner illustrated with reference to FIGS. 2A and 2B. The housing 21 may be affixed to the diverters with adhesive, or as an alternative they may be welded or melded together. The micro generator 25 is located inside the inner body 22 in the embodiment shown and is connected to a shaft 26 which passes through the second section 24, on which shaft in turn is mounted a propeller 27. As such the armature of the micro turbine 25 may be turned by the action of the organized flow, and preferably the spiraling vortex flow 122, created in the chamber 20, which organized flow acts on the propeller 27 to rotate the propeller and shaft 26.

In an alternative embodiment, the second section 24 is rotatably joined to the first section 23 and the organized flows acts to rotate the second section 24 against the first section 23 of the inner body 22. This also has the effect of turning an armature in the micro generator 25 to generate electricity. The motion of the second section 24 can be further aided by the addition of turbine blades to the exterior surface of the second section 24 or by roughening the exterior surface of the rotatable second section. Bearings may be used to allow the second section 24 to freely spin on the first section 23, with the motion of the fluid spinning the second section 24. The bearings are used to permit the parts to rotate without the need for grease or maintenance. In an alternative embodiment, the turbine blades and/or the roughened surface may be provided in place of, rather than in addition to the propeller 27 and shaft 26.

In another embodiment, the propeller 27 and shaft 26 are used and the interior of the outer housing 21 is provided with turbine blades or rifling 124 (See FIG. 4A), to direct and enhance the flow through the propeller. Wiring 123 is provided to carry power generated by the micro turbine 25 to an external storage device 125 or to other devices for immediate use.

In an alternative embodiment, the inlet pipe 28 may be configured to allow the fluid to enter the chamber 20 tangentially, rather than along the central axis of the chamber 20 as shown in FIG. 4. See for example U.S. Patent Application Publication No. 2005/0000581, FIGS. 2, 3A, 3B, 7, etc. and the accompanying text. In another alternative embodiment, the inner body of the chamber can be either solid or hollow. In yet another alternative embodiment, the housing 21 may be connected to either the inlet pipe 28 and/or the outlet pipe 29 using plates and gaskets or by an epoxied or glued joint or by being formed as a single continuous piece. Furthermore, additional methods of achieving an organized flow which may be utilized in alternative embodiments of the present invention are discussed more broadly in U.S. Patent Application Publication No, 2005/0000581.

Figure 5:
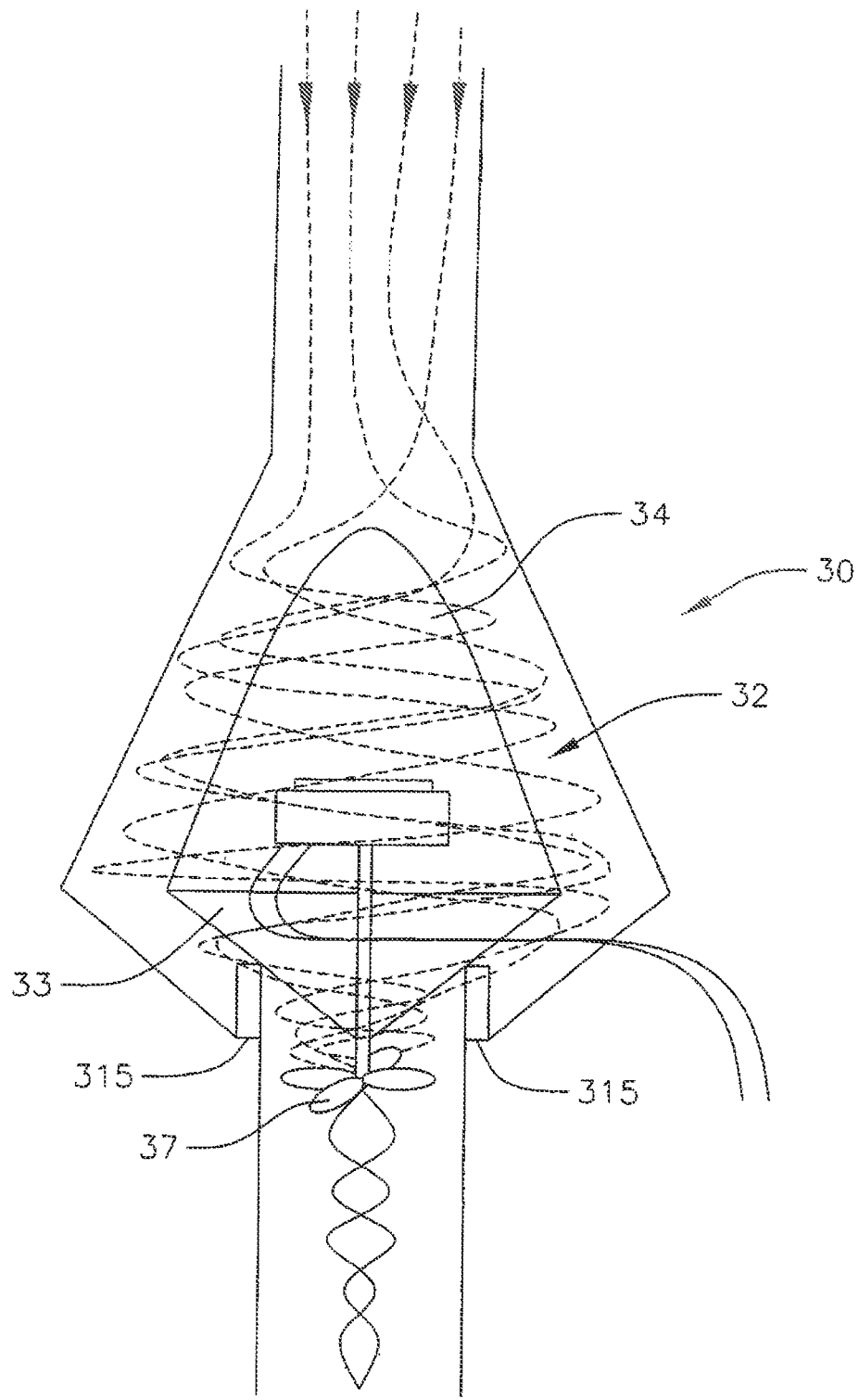
FIG. 5 shows a side view of an additional embodiment a flow development and cogeneration chamber wherein the fluid flows through the chamber in a reverse direction.

FIG. 4 depicts an exemplary embodiment of an inner body having a second rounded section 24 and a first pointed section 23. In these figures, the fluid flow passes around the inner body 22 before turning the propeller 27. Whereas FIG. 4 shows fluid flow in a forward direction, FIG. 5 shows the reverse direction wherein fluid passing through a flow development and cogeneration chamber 30 flows over a second rounded section 34 of the inner body 32 before passing over a first pointed section 33, after which it continues on to flow past a propeller 37. Deflecting vanes 315 are provided in the chamber adjacent and upstream of the propeller which deflecting vanes 315 aid in the development of the organized flow.

Figure 6:
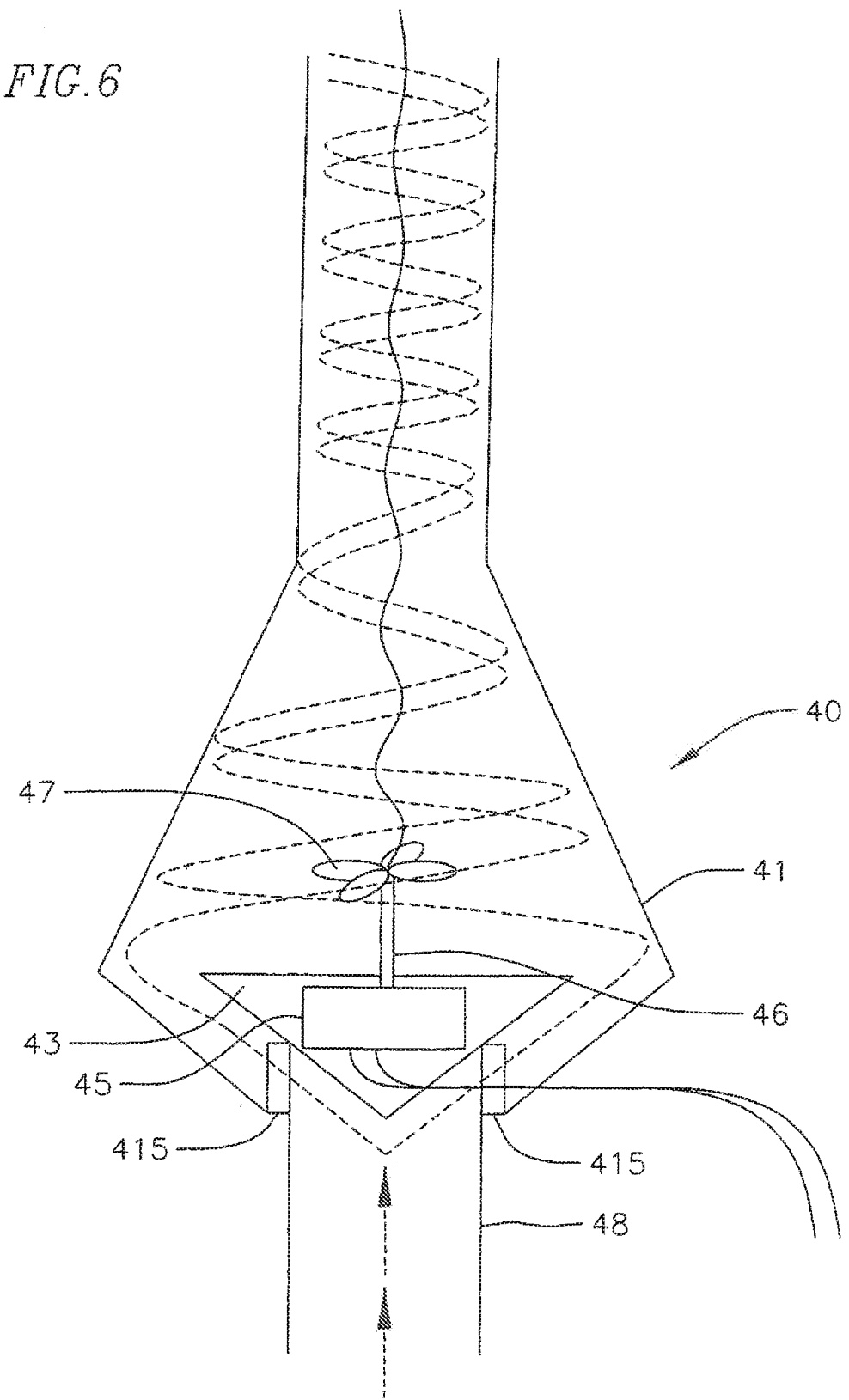
FIG. 6 shows a flow development and cogeneration chamber according to an alternative embodiment having a single section inner body.

FIG. 6 shows another embodiment of a flow development and cogeneration chamber 40 having an inner body comprising a single section 43 provided as a pointed section directed toward the source of the fluid flow, namely the inlet pipe 48. A propeller 47 mounted on a shaft 46 extends up from the first section 43 of the inner body. Deflecting vanes 415 are provided in the chamber adjacent the inlet pipe 48. As above, the deflecting vanes 415 aid in the development of the organized flow as a fluid passes over the first inner body section 43 within a housing 41. The organized flow created by fluid flowing over the section 43 of FIG. 4 is used to turn the shaft-mounted propeller 47 which in turn rotates a micro turbine 45 located inside the section 43 to generate electricity. The single first section may also be used in the reverse direction flow of FIG. 5, wherein the pointed section is directed away from the source of the fluid flow.

Figure 7:
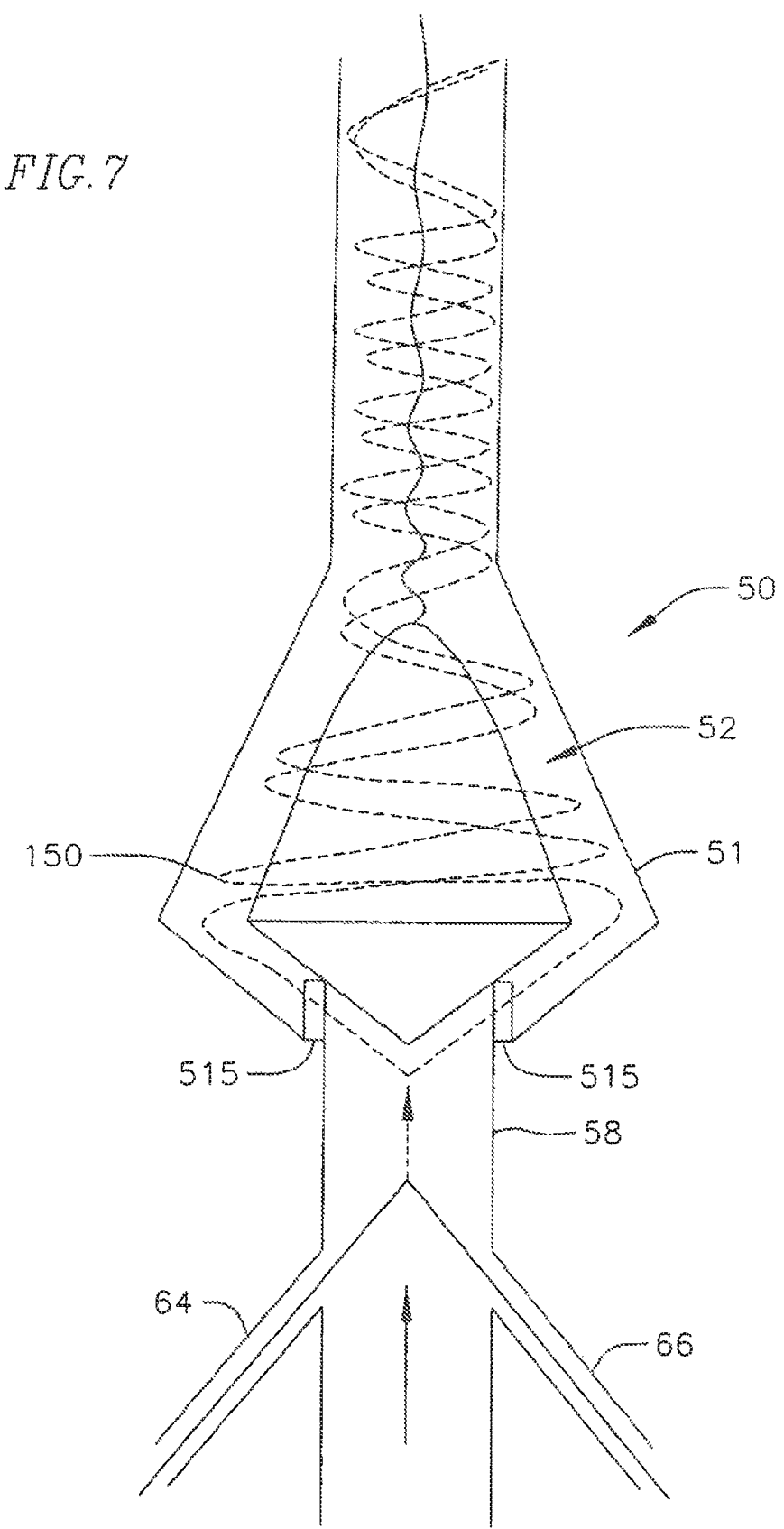
FIG. 7 shows a flow development chamber according to one embodiment of the present invention used to mix two flowable materials.

FIG. 7 depicts a flow development chamber 50 employed to aid in the mixing of two flowable materials such as a liquid with another liquid, a liquid with a gas, or a gas with another gas. A flowable solid may also be mixed with another flowable solid, liquid and/or gas. After meeting and flowing together in the inlet pipe 58 from feed pipes 64, 66, these substances continue into a housing 51 flowing over an inner body 52. Deflecting vanes 515 are provided in the chamber adjacent the inlet pipe or formed from an upstream end of the inlet pipe 58. As above, the deflecting vanes 515 aid in the development of a vortex flow 150 as a fluid passes over the inner body 52 within the housing 51, which vortex flow 150 mixes the two substances.

Figure 8:
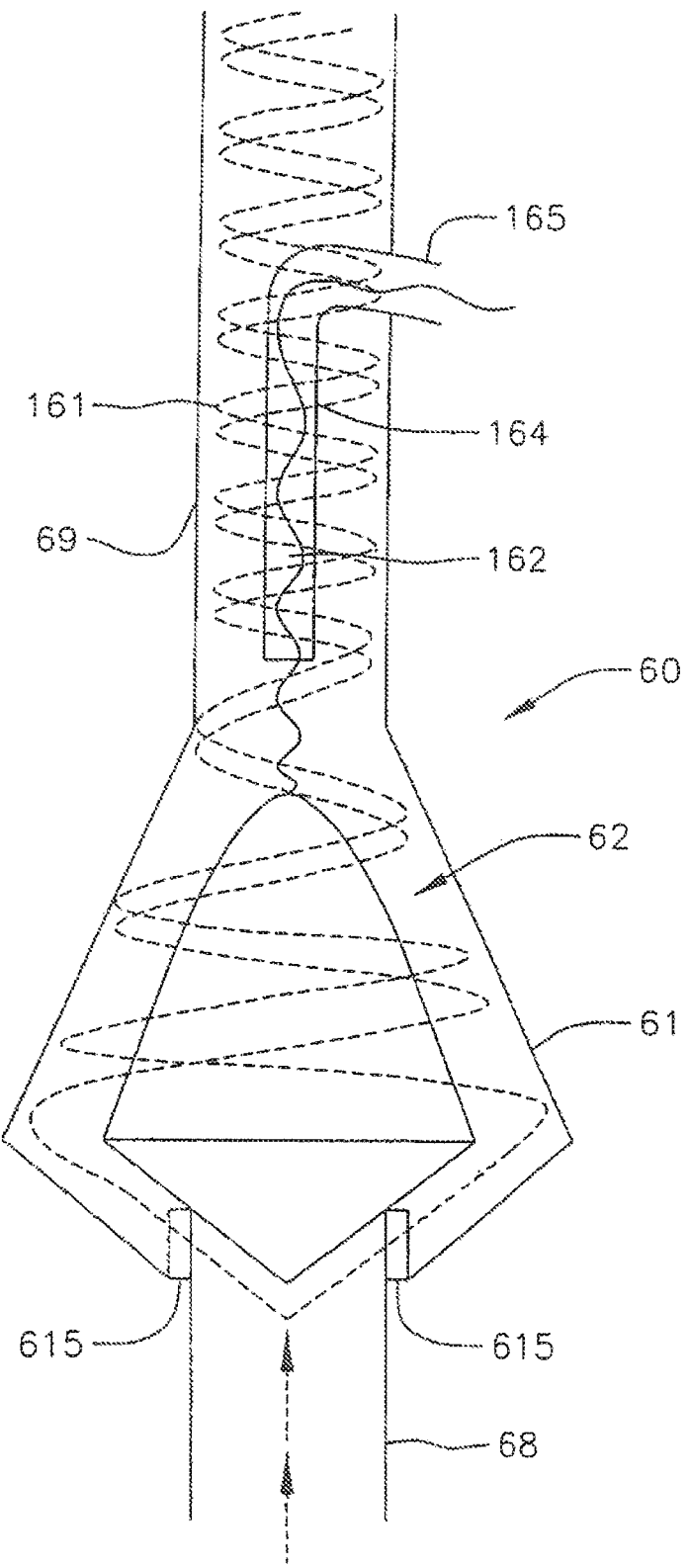
FIG. 8 shows a flow development chamber according to one embodiment of the present invention used to separate two flowable materials.

In another embodiment, a flow development chamber may be employed to separate rather than mix a plurality of substances by creating and selectively diverting parts of an organized flow. These substances may include flowable solids as well as liquids and gasses. FIG. 8 shows a flow development chamber 60 which may be used to establish an organized flow wherein a liquid and a gas, liquids of different densities, or gases of different densities may be separated into a spiraling vortex flow 162 and a helical flow 161 around the spiraling flow. Deflecting vanes 615 are formed from an upstream end of an inlet pipe 68 or otherwise provided. As above, the deflecting vanes 615 aid in the development of the organized flow as a fluid passes over an inner body 62 within a housing 61. In the embodiment shown, an organized stream of air in the spiraling flow 162 is separated from a water mixture in the helical flow 161 and collected in a diverter pipe 164 inserted into the housing 61 of the chamber 60 and ejected from an outlet pipe 165. Because of its ability to remove air from a water-air mixture, the chamber 60 may for example be used with a stream of water intended for a fire hose to provide a more effective flame suppressant stream.

The diverter pipe 164 and outlet pipe 165 may be supported within the chamber 60 by attachment to the housing 61 of the chamber 60 at the point at which outlet pipe 165 passes through the housing 61. In this way, the portion of the diverter pipe 164 running lengthwise through the interior of the housing 61 of the chamber 60 forms a cantilever member relative to its attachment point at the housing 61. In the embodiment shown, the outlet pipe 165 exits the housing 61 close to the end of the outlet pipe 69 so that the extent of disruption of the helical and spiraling flows 161 and 162 is minimized.

The diverter pipe 164 may be supported within the outlet pipe 69 using pins or struts (not shown) passing between the outlet pipe 69 and the diverter pipe 164. The organized flow within the chamber 60 may be disrupted by these pins. However, if these pins are small enough in diameter it is likely that any such disruption to the organized flow will be minimal. In the event that the diverter pipe 164 or its supports does disrupt the organized flow within the chamber 60, a second flow development chamber may be provided downstream from the disruption to reestablish the organized flow.

Returning now to FIG. 1, the flow processing device 15 may be any device capable of sharing a fluid flow with a flow development and cogeneration chamber 10. For example, in one embodiment, the device 15 is a home hot water heater. The flow development and cogeneration chamber 10 may be placed at the fluid outlet, inlet or at another appropriate place in line with the flow processing device 15. In a further exemplary embodiment shown, the chamber 10 is placed at the outlet of the heater 15, which connects to the inlet conduit of the chamber 10. In an alternative embodiment, the device 15 is another electricity consuming device such as submersible water pump, fuel pump, continuous mixer or the like, and electricity generated by the chamber 10 may be used to operate the device 15. As further shown with reference to FIG. 1, a fluid from a feed 16 passes to the device 15 and then to the chamber 10, where an organized flow is created and electricity is generated. This electricity can either be retained in a storage cell 14 or supplied to the device 15 using the wiring 13, 13' and used to cogenerate the ongoing operation of the device, for example by pre-heating contents of the hot-water tank where the device 15 is a home hot water heater. After forming an organized flow and being used to cogenerate the device 15, fluid exits the system at the outlet conduit 12 for consumption by a user.

In a further embodiment, a computer controller 17 may be provided to regulate the amount of fluid input into the system. The controller 17 may include a variable frequency drive or transducer with a valve to automatically or manually regulate the flow of a given substance. Alternative embodiments of the controller 17 may be provided to allow manual regulation of the fluid input by a user, or to allow system parameters to be set to deliver a constant flow.

In another embodiment, the device 15 may be a submersible water pump primed using an existing electricity or gas supply. As water passes through the chamber 10, electricity generated by the chamber 10 may be stored in the storage cell 14 or used to cogenerate the pump, whereby a portion of the generated power is used to operate the pump in lieu of drawing that amount from the pump's primary power source, thereby reducing the amount of energy otherwise needed to operate the pump.

In yet other alternative embodiments, the chamber 10 may be placed in the exhaust systems of automobile, boat, train or jet engines. By passing exhaust gases through the chamber 10 to create an organized flow before venting these gases to atmosphere, backpressure on the engine may be reduced and engine performance may be improved. As with the previously mentioned embodiments, the flow development and cogeneration chamber 10 can also be used to cogenerate electricity in such a situation, which electricity may either be consumed by the engine, or stored in the storage cell 14. It will be understood by one skilled in the art that embodiments of the system described herein can be scaled to varying sizes and made to work with various flow processing devices.

Although this discussion refers to fluids passing through the flow development chamber, it will be apparent to one skilled in the art that gases and other substances may be passed through the flow development chamber and cogeneration chamber described herein in place of or in addition to the aforementioned fluids. And although many of the embodiments of the invention have been discussed in terms of a fluid, these embodiments would function equally well with any mixture of fluids, a gas alone, a liquid, or any combination of gas, liquid and/or particulates. Furthermore, although the foregoing describes the invention with preferred embodiments, this is not intended to limit the invention. Rather, the foregoing is intended to cover all modifications and alternative constructions falling within the spirit and scope of the invention.

What is claimed is:

1. A flow development chamber comprising:
   an exterior housing having an inlet opening and an outlet opening;
   an inner body within the exterior housing;
   an inlet tube at the inlet opening;

and
a generator comprising a rotatable portion within the exterior housing and downstream from the inner body for generating electrical power;
wherein the flow development chamber is configured to organize a flow from the inlet tube into a least one of a spiraling vortex flow that circulates between the exterior housing and the inner body towards the outlet opening, and wherein the generator is configured to harness the spiraling or vortex flow to rotatable portion for generating the electrical power.

2. The flow development chamber of claim 1, wherein the inner body is a radially symmetric body having an axis and a series along the axis decreasing in area from an equator outward to each of a first end and a second end of the inner body.

3. The flow development chamber of claim 1, wherein the inner body is a radially symmetric body having an axis and a series of cross-sections along the axis decreasing in area from a first and to a second end of the inner body.

4. The flow development chamber of claim 1, further comprising a propeller connected to a shaft, which shaft is connected to an armature of the generator for harnessing the flow within the flow development chamber.

5. The flow development chamber of claim 4, wherein the inlet opening is concentric to the axis of the inner body.

6. The flow development chamber of claim 2, wherein the inner body comprises a first portion between the equator and the first end and a second portion between the equator and the second end, and wherein the second portion is rotatably connected to the first portion and engages an armature of the generator.

7. The flow development chamber of claim 6, further comprising one or more turbine blades provided on the second portion of the inner body.

8. The flow development chamber of claim 6, wherein the second portion of the inner body has a roughened outer surface.

9. The flow development chamber of claim 6, wherein the generator is affixed to the first portion of the inner body.

10. The flow development chamber of claim 4, further comprising turbine blades or rifling on an interior surface of the exterior housing.

11. The flow development chamber of claim 1, wherein the flow development chamber shares a fluid flow with an electricity consuming device, and wherein electricity generated by the flow development chamber is used to operate the electricity consuming device.

12. The flow development chamber of claim 1, further comprising a storage device connected to the generator for storing the electrical power generated by the generator.

13. The flow development chamber of claim 1, wherein the exterior housing comprises an interior surface that increases and then decreases in diameter from the inlet opening to the outlet opening.

14. The flow development chamber of claim 1, further comprising at least one diverter adjacent the inlet opening configured to organize the flow from the inlet tube into the spiraling or vortex flow.

15. The flow development chamber of claim 14, wherein the at least one diverter supports the inner body within the exterior housing.

16. The flow development chamber of claim 14, wherein the inlet tube and the at least one diverter are formed as a single continuous unit to which the exterior housing and the inner body are secured.

17. The flow development chamber of claim 1, wherein the generator is a micro-turbine device.

18. The flow development chamber of claim 1, wherein the inner body is a radially symmetric body having an axis and a series of cross-sections along the axis increasing in area from the inlet opening towards the outlet opening.

19. The flow development chamber of claim 1, wherein the rotatable portion is between the inner body and the outlet opening.

20. The flow development chamber of claim 1, wherein at least a portion of the inner body extends into the outlet opening.

21. The flow development chamber of claim 1, wherein at least a part of the rotatable portion extends into the outlet opening.

22. The flow development chamber of claim 1, wherein at least a portion of the inner body has a constant cross-sectional thickness along an axis from the inlet opening to the outlet opening.

* * * * *